United States Patent Office 2,977,318
Patented Mar. 28, 1961

2,977,318

SUBSTITUTED AMIDE INHIBITED ACID COMPOSITIONS

Robert W. Liddell, Bethel Borough, Pa., assignor to Hagan Chemicals & Controls, Inc., a corporation of Pennsylvania No Drawing. Filed June 20, 1956, Ser. No. 592,481

4 Claims. (Cl. 252—136)

This invention relates in general to the inhibition of metallic corrosion in acidic environment. It relates in particular to a novel method of preventing or minimizing the corrosion of zinc which is a metal extremely susceptible to attack by acids of all types and in varying concentrations.

It is generally accepted fact that most metals susceptible to acid corrosion are progressively corroded by water or aqueous solutions by increasing the concentration of acids in aqueous solutions with a corresponding lowering of the pH value of the solutions. For example, ordinary mild or low carbon steel, which is subject to corrosion in distilled water (pH 7) will corrode more rapidly at pH 3 or even more rapidly at pH 1. The same effect is noted when certain non-ferrous metals are exposed to increased acidity whether the acid be inorganic in nature, such as hydrochloric, nitric, sulfuric, or phosphoric acid, or the less aggressive and less acidic organic acids such as acetic, oxalic, or others of a more complex structure whether they be organic or inorganic such as sulfamic acid.

Sulfamic acid, $NH_2SO_2OH$ is a non-volatile, non-hygroscopic white crystalline solid, readily soluble in water. It is an inorganic compound which is classified as a "strong" acid. At a concentration of 0.5 mole per liter the pH of a sulfamic acid solution is about 0.6 as compared with 0.3 for sulfuric acid and slightly less than 0.4 for $HNO_3$ and HCl. Sulfamic acid falls between oxalic acid and hydrochloric acid in pH and it is somewhat more acidic than phosphoric acid.

Since sulfamic acid is a solid material available in free-flowing finely divided crystalline form, it has found use as a substitute for the more common acids such as sulfuric, hydrochloric, and nitric acids, especially where employed in the acid cleaning of metals. The liquid acids are difficult to handle and require numerous precautions in handling whereas sulfamic acid is relatively safe even in the hands of inexperienced persons.

Mineral acids such as hydrochloric or sulfuric acid have been used to dissolve scale (which is largely calcium and/or magnesium carbonate) deposited from waters which are high in these dissolved solids. Cleaning of boiler tubes, condensers, evaporators, and similar equipment can be carried out with either the mineral acids or sulfamic acid, the latter being preferred since it is less corrosive to steel and ferrous alloys that are susceptible to corrosion from the strong mineral acids.

Certain equipment fabricated from steel is coated with zinc to give the well known galvanized finish. This zinc coating protects the steel from corrosion during fabrication and under normal usage, and this coating will materially delay the corrosion of the steel. Galvanized sheet steel is one of the most widely used materials in the fast-growing heating, ventilating, and air-conditioning industry.

A substantial air-conditioning installation requires a cooling tower or heat exchanger over whose surfaces water continuously flows to cool the refrigerant employed in the air-conditioning system. The least expensive construction material other than uncoated and unprotected steel sheet is galvanized sheet steel which will give reasonably long service except when subjected to low pH conditions. In many situations a troublesome scale-forming occurs as the calcium and/or magnesium salts are deposited on the heat exchange surfaces with attendant lowering of the efficiency of the system.

Strong acids have long been employed in removing this troublesome scale from heat exchanger surfaces, and in recent years the more safely handled yet quite effective sulfamic acid has been increasingly used. Equal concentrations of sulfamic, hydrochloric, or sulfuric acid while about equally effective in removal of scale, have markedly different effects upon the metal surfaces from which the scale is removed. For example, it is claimed that at 3% concentrations (in water) at 72°±4° F. using the corrosion rate of sulfamic acid as 1, the rate of corrosion of SAE 1010 carbon steel is 2.6 with sulfuric acid and 4.2 with hydrochloric acid. On zinc surfaces, sulfuric acid is more than twice as corrosive as sulfamic acid and hydrochloric acid almost immediately begins to pit the zinc coating on exposure to it.

Although sulfamic acid is less corrosive to metals in general and to zinc in particular, than the strong mineral acids, even relatively short contact with a dilute sulfamic acid solution will adversely affect a galvanized coating. For example, a 3% solution of sulfamic acid will at room temperature and with agitation of the solution, completely strip a galvanized coating from steel test specimens in about twenty minutes. Thus we see that even with a more favorable overall degree of protection than afforded by mineral acids, sulfamic acid cannot be used in the presence of zinc without causing an adverse reaction to take place.

It has long been said that galvanized (zinc plated) surfaces cannot be protected against corrosion where an acidic environment prevails, particularly where the acid is present in dilute solutions. I have, however, discovered not only that I can protect these surfaces from corrosion by sulfamic acid, but also from corrosion by strong mineral acids as well. Heretofore, a zinc-plated SAE 1010 steel strip immersed in a 3% solution of sulfamic acid began to show base metal within 15–20 minutes after immersion in the agitated acid solution at room temperature. Within one-half hour the entire surface coating of zinc had been removed by the sulfamic acid.

Similarly, when a dilute (3%–20%) solution of sulfuric or hydrochloric acid is used, the zinc coating disappeared even more rapidly.

I have found that a hitherto unobtainable degree of protection against acid attack of zinc and zinc-plated ferrous and non-ferrous metals can be achieved by adding to the acid (or to the solution of acid) a small amount of an N-substituted amide (either a mono- or di-substituted amide) which can be designated by the general formula:

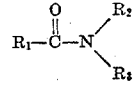

where $R_1$ is an alkyl or alkenyl group containing 7 or more carbon atoms, $R_2$ is an alkyl or alkenyl group containing from 2 to 18 carbon atoms and $R_3$ is hydrogen or an alkyl or alkenyl group containing from 2 to 18 carbon atoms. Preferably $R_2 + R_3$ should not contain in excess of 24 carbon atoms if a readily soluble product is to be obtained.

I have found most satisfactory results are obtained with the di-substituted amides. The di-substituted amides I have prepared are soluble in dilute solutions of sulfamic acid as well as in dilute solutions of both HCl and $H_2SO_4$.

Preferably, I employ from about 1.5% to about 5.0% by weight of sulfamic acid, and about 3% to about 5% by weight of HCl and H₂SO₄ respectively. However, I may use as little as ½% and as much as 8% of the di-substituted amide in these acids or other corrosive acidic compounds in protecting zinc surfaces.

The substituted amides I have found so beneficial may be prepared from either saturated or unsaturated hydrocarbon derivatives by reacting an acid or acyl chloride of the hydrocarbon with the particular amine I select.

I have prepared a number of di-substituted amides which insofar as I am aware have not been hitherto disclosed in the prior art as having useful properties as zinc corrosion inhibitors, these being the reaction products formed by heating lauroyl chloride

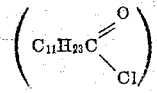

on the steam bath for 1–2 hours in an inert atmosphere with (a) di-isopropylamine; with (b) N-ethylhexyl cyclohexyl amine; and with (c) N-ethylcyclohexyl amine. This reaction is preferably carried out in an inert solvent such as acetone; pyridine, tertiary amine, or alkali may be added to absorb the HCl liberated.

The reaction products (a), (b), and (c) are represented by the following formulae:

(a) Lauroyldiisopropylamide—

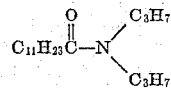

(b) Lauroyl N-ethylhexylcyclohexylamide—

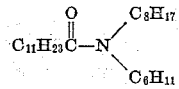

(c) Lauroyl N-ethylcyclohexylamide—

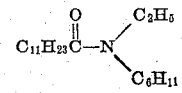

Additionally, I may react under similar conditions saturated or unsaturated organic acids such as palmitic acid, oleic acid

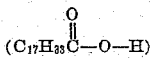

or linoleic acid

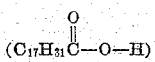

with diisopropylamine to obtain di-isopropyloleamide or di-isopropyllinoleamide respectively which are effective zinc inhibitors. Here I employ temperatures of 200°–210° C. for 1–2 hours and an inert atmosphere, for example by bubbling nitrogen through the solution.

To illustrate the effectiveness of my new compositions, I cut small specimens of 24 gauge cold-rolled SAE 1010 steel galvanized by the hot dip method by Wheeling Steel Corporation and designated as "Soft-Tight" galvanized sheet. This is a type of sheet identified as standard for commercial quality and has a zinc coating which is from 0.9 to 1.0 ounce per square foot per side of sheet. In other words, one square foot of the sheet has about 2.0 ounces of zinc deposited on it. The fact that a bimetallic couple is set up between the zinc and the steel on which the zinc is plated makes the corrosion resistance of a zinc plated steel sheet considerably less than that of a pure zinc specimen, and a breakdown of the zinc plating generally begins at the edges of the strip where a cross-section of the strip appears as steel sandwiched between two thin layers of zinc.

In 400 ml. beakers I placed 300 ml. of acidic solution, immersed the strips and constantly agitated the solutions at room temperature by means of air introduced through a glass tube with the stream of air bubbling upwardly through the solution. Agitation and introduction of air provides a much more severe test than a simple stagnant test where the strip is permitted to stand in a quiescent solution.

All samples of sulfamic acid solution contained 3% by weight inhibited sulfamic acid, this being 96% acid, 2% silica gel, and 2% inhibitor, the solutions of sulfuric acid contained 5% by weight, and hydrochloric acid 2% by weight. The particular inhibitor employed, concentration of inhibitor, and results of the tests are shown in the following table:

Table I

| No. | Acid | Inhibitor | Remarks |
|---|---|---|---|
| 1 | 3% Sulfamic | none | Zinc coating entirely stripped off in 12-20 minutes. |
| 2 | do | N-diisopropyl-lauramide. | Coating intact after 30 hrs.; some zinc remaining after 4½ days. |
| 3 | do | N-diisopropyl-oleamide. | Coating intact after 4 hrs. |
| 4 | do | N-diisopropyl-linoleamide. | Coating intact after 4 hrs; ¾ of coating still intact after 2½ days. |
| 5 | do | N-ethylcyclo-hexylauramide. | Coating intact after 30 hrs; 90% intact after 3½ days. |
| 6 | do | N-ethylhexylcy-clohexylaur-amide. | Coating intact after 72 hrs; over 95% intact after 3½ days. |
| 7 | do | N-diisopropyl-caprylamide. | Coating intact after 4 hrs.; 60% intact after 2½ days. |
| 8 | do | N-dodeclauramide. | Coating 95% intact after 4 hrs. |
| 9 | 5% H₂SO₄ | None | Coating 50% removed in 10 minutes. |
| 10 | 5% H₂SO₄ | N-ethylhexylcy-clohexylaur-amide. | Coating 95% intact after 5 hrs.; 60% intact after 24 hrs. |
| 11 | 2% HCl | None | Coating 50% removed in 10 minutes. |
| 12 | 2% HCl | N-ethylhexylcy-clohexylaur-amide. | Coating intact after 5 hrs.; 90% intact after 24 hrs. |
| 13 | 3% NaHSO₄.1H₂O | None | 50% removed after 10 minutes. |
| 14 | 3% NaHSO₄.1H₂O | N-ethylhexylcy-clohexylaur-amide. | Coating intact after 5 hrs.; about 95% intact after 24 hrs. |

The substituted amides which I have found are possessive of these unique inhibitory properties in acidic environment are generally viscous liquids which are generally soluble in mineral acids such as HCl and H₂SO₄. However, when admixed with sulfamic acid or other solid materials it is desirable to apply the amides to an inert carrier such as clay, kieselguhr, carboxymethylcellulose or the like. Silica gel is a particularly useful carrier for this purpose.

The amide may be dissolved in most organic solvents such as CCl₄, CHCl₃, or the like and sprayed on the carrier, or it may be tumbled or otherwise mixed directly with the carrier which is subsequently dry mixed with the solid acid or acid-reacting compound. While the exact mechanism of the corrosion inhibition is not entirely understood by me, it appears to involve a surface coating or wetting out and certain wetting agents of the non-ionic type are beneficial, although not absolutely necessary to secure the desired protective result. For example, Pluronic L-62 or Pluronic F-68 made by Wyandotte Chemicals Corporation are effective wetting agents for my purpose.

It will be obvious that minimal amounts of the substituted amides are to be desired in view of the fact that their cost is much greater than the cost of any of the common mineral acids and somewhat greater than the cost of sulfamic or other solid acids. Generally speaking, but not intending to be limited in any way, I may use as little as 0.5% of the N-substituted amide based on the weight of the finished inhibited acid, including the inert carrier where it is needed. For sulfamic acid a suitable range of components is from about 0.5% to about 8% of N-substituted amide, from about 0.2% to about 5% of inert material, the remainder of the mixture being the acid itself. Where I employ my products with mineral acids, the range of inhibitor concentration by weight will be from about 1% to about 10% and the range of acid from about 99% to about 1% by weight. Where wetting agents are used, they need not be present beyond a small concentration say in the order of 0.1% to 1.0%.

Although I have described my invention primarily in connection with inhibiting acids which are used on galvanized steel in removal of scale deposits, it is contemplated that these inhibiting materals will be used in various applications such as pickling or acid cleaning of zinc coated sheets or zinc coated structural members of all types whether galvanized by hot-dip or electrolytic processes.

These new compositions are not only effective alone but can be used advantageously with other materials customarily employed in acid-reacting cleaners or scale-removers. They may also be employed as inhibitors for acids and acidic products in contact with zinc elements of circulating systems as for example, in condensers, evaporative systems, or even in underground acidizing of wells if zinc corrosion is likely to be encountered. It will therefore be understood that the invention is not restricted to the compositions given by way of illustration nor by any theory proposed in explanation of the improved results which are obtained.

I claim as my invention:

1. An acidic composition essentially non-corrosive to zinc which consists essentially of (a) about 92 to 99.5 percent by weight of sulfamic acid and (b) from about 0.5 percent by weight to about 8.0 percent by weight of N-diisopropyllauramide.

2. A composition as described in claim 1 where (b) is N-ethylcyclohexyllauramide.

3. A composition useful in removing scale deposits from zinc which comprises (a) an acid selected from the group consisting of hydrochloric acid, sulfuric acid, phosphoric acid, and sulfamic acid, (b) an N-substituted amide having the general formula

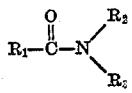

where $R_1$ is a radical selected from the alkyl and alkenyl groups containing from about 7 to about 18 carbon atoms, $R_2$ is a radical selected from the alkyl and cycloalkyl groups containing from 2 to 12 carbon atoms and $R_3$ is a radical selected from hydrogen, cycloalkyl, and alkyl groups containing from 2 to 8 carbon atoms and (c) water (b) being from about 0.5% to about 8% of the total mixture.

4. An acidic composition essentially non-corrosive to zinc which consists essentially of (a) about 90% to about 99.5% by weight of sulfamic acid and (b) about .5% to about 10% of a compound selected from the group consisting of N-substituted amides having the general formula

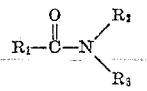

where $R_1$ is a radical selected from the alkyl and alkenyl groups containing from about 7 to about 18 carbon atoms, $R_2$ is a radical selected from the alkyl and cycloalkyl groups containing from 2 to 12 carbon atoms and $R_3$ is a radical selected from hydrogen, cycloalkyl and alkyl groups containing from 2 to 8 carbon atoms.

References Cited in the file of this patent

UNITED STATES PATENTS

| | | |
|---|---|---|
| 2,148,006 | Arveson | Feb. 21, 1939 |
| 2,220,451 | Hunt | Nov. 5, 1940 |
| 2,225,294 | Bolton et al. | Dec. 17, 1940 |
| 2,330,524 | Shields | Sept. 28, 1943 |
| 2,465,987 | Gorman | Apr. 5, 1949 |
| 2,521,311 | Schwoegler et al. | Sept. 5, 1950 |
| 2,598,213 | Blair | May 27, 1952 |
| 2,638,449 | White | May 12, 1953 |
| 2,672,449 | Snell et al. | Mar. 16, 1954 |
| 2,759,894 | Matuszak | Aug. 21, 1956 |
| 2,799,659 | Mayhew et al. | July 16, 1957 |
| 2,805,135 | Bell et al. | Sept. 3, 1957 |
| 2,824,884 | Barnhart et al. | Feb. 25, 1958 |

FOREIGN PATENTS

| | | |
|---|---|---|
| 151,473 | Australia | May 18, 1953 |

OTHER REFERENCES

Corrosion Handbook, by Uhlig, pages 910–912 (1948), pub. by John Wiley, N.Y.